Patented Dec. 7, 1948

2,455,897

UNITED STATES PATENT OFFICE 2,455,897

1,5-DIARYLBIGUANIDES FROM AROMATIC AMINES AND DICYANIMIDE

Daniel E. Nagy, Stamford, Conn., assignor to American Cyanamid Company, New York, N. Y., a corporation of Maine No Drawing. Application October 12, 1945, Serial No. 622,076

6 Claims. (Cl. 260—565)

This invention relates to a method for preparing aromatic substituted biguanides.

Substituted biguanides which may be prepared by the method of the present invention may be represented by the formula

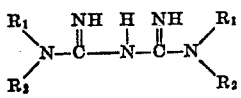

where $R_1$ is an aromatic organic radical and $R_2$ is a member of the group consisting of hydrogen, aliphatic, aromatic, and heterocyclic radicals. These substituent radicals may be saturated or unsaturated.

In the present invention, the substituted biguanides may be prepared by the reaction of an amine of the formula

where $R_1$ and $R_2$ have the meanings above given, with a dicyanamide. The general reaction is shown in Equation 1.

(1)
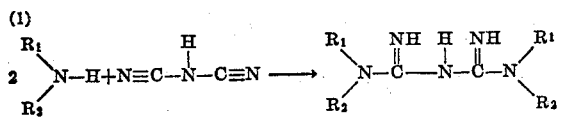

in which the R's have the meanings above given.

The present invention also contemplates that the substituted biguanides may be prepared by the reaction of a primary or secondary amine salt with a dicyanimide salt. The final product obtained by the interaction of the above two salts is a substituted biguanide salt and an inorganic salt.

In actual practice it is preferred to prepare the substituted biguanides by the reaction of an aromatic primary or secondary amine salt with a dicyanimide salt, which is the form in which the dicyanimide is usually prepared, recovered, and stored.

The aromatic primary and secondary amines which can be used in the preparation of substituted biguanides may have various substituents on the organic radicals in addition to the active amino group. Amines typical of those capable of undergoing the reaction of the present invention are Aniline
α-Naphthylamine
β-Naphthylamine
o-Aminodiphenyl
Sulfanilic acid
Sulfanilamide
2-sulfanilamidopyrimidine
Sulfanilylguanidine
2 - sulfanilamidopyrazine
2 - sulfanilamidopyridine
2 - sulfanilamidothiazole
Aminonaphthalenesulfonic acid
Aminotoluenesulfonic acid
Aminophenols
Aminonaphthols
Methylaminophenols
Aminothiophenols
Toluidines
Xylidines
Methylnaphthylamines
Aminoethylbenzenes
Phenylenediamines
Naphthylenediamines
Aminobenzoic acids
Ethyl aminobenzoates
Aminobenzamides
Phenylglycines
Aminophenylglycines
Aminobenzaldehydes
Ethylaniline
Methylaniline
Chloroanilines
Bromoanilines
Nitroanilines
Anisidines
Diaminophenols
Diaminonaphthols
Diaminodiphenylmethanes These amines and their salts are typical of those which react with a dicyanimide to form a substituted biguanide. It is to be understood that these amines may be substituted by various organic radicals, groups, or elements which do not prohibit their reaction with dicyanimide. Numerous substituents have already been illustrated in the above list of amines.

The reaction of the present invention may be run with or without either a solvent and/or a diluent or it may be run by the fusion of the reactants. However, it is preferred that the reaction be run in the presence of water. The temperature range in which this reaction takes place is approximately 80°–150° C. However, the preferred temperature range for this reaction is approximately 90°–130° C.

If the reaction of the present invention is carried out with a metal salt of dycyanimide it is to be understood that any metal salt from which the free dicyanimide may be liberated may be used. However, it is preferred that the calcium, sodium, and potassium salts of dicyanimide be used because these compounds are the most inexpensive and the most easily prepared salts of dicyanimide.

If an amine salt is used as a source of amine for the reaction of the present invention, the use of common salts, such as the hydrochloride, sulfate, and acetate is preferred. Any salt from which the amine may be liberated is suitable for this reaction.

The dicyanimide and/or its metal salts which are used as a reagent in this invention may be prepared by the reaction of a cyanogen halide with a metal salt of cyanamide. It is usually preferred that the metal salts of dicyanimide be prepared by the reaction of cyanogen chloride with an aqueous slurry and/or solution of a metal salt of cyanamide in a temperature range of substantially 0°–50° C. If desirable, these salts may be used in solution without isolating them from the reaction mixture obtained above.

The preparation of an aqueous solution containing calcium dicyanimide is included in the following example as typical preparations of dicyanimide salts suitable for the reaction with amines to yield substituted biguanides.

EXAMPLE 1

| Reagents | Molar Ratio |
| --- | --- |
| Cyanogen chloride | 1.0 |
| Crude calcium cyanamide (61%) | 1.1 |
| Water | 13.9 |

The thick calcium cyanamide slurry is stirred about 10 minutes prior to the addition of cyanogen chloride. This treatment serves to wet thoroughly the calcium cyanamide particles so that a satisfactory reaction with cyanogen chloride may be had. The cyanogen chloride is added at a temperature range of 24°–26° C., and at a rate of substantially one mol per hour. When the reaction is completed, as indicated by the spontaneous drop in temperature of a couple of degrees, the mixture is filtered to remove insoluble materials. This clear filtrate may be used without attempting to recover crystalline calcium dicyanimide therefrom.

The examples which follow show the preparation of typical substituted biguanides according to the method of the present invention.

EXAMPLE 2

1,5-diphenylbiguanide

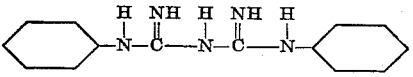

| Reagents | Molar Ratio |
| --- | --- |
| Calcium dicyanimide | 0.45 |
| Aniline | 2.00 |
| Hydrochloric acid, conc | 1.00 |
| Water | 24.00 |

One-half of the above amount of aniline is added to a solution of calcium dicyanimide in about two-thirds of the above amount of water. The hydrochloric acid is diluted with the remaining amount of water, and this solution is slowly added at substantially 80° C. to the agitated mixture containing aniline and calcium dicyanimide. When approximately one-half of the hydrochloric acid is added, the remainder of the aniline is added. Crystals of 1,5-diphenylbiguanide hydrochloride separate soon after the addition of the hydrochloric acid is completed. The reaction mixture is heated an additional 30–60 minutes, then cooled and filtered. The crystals are washed with cold water and air-dried. 1,5-diphenylbiguanide hydrochloride melts at 223°–225° C. The free base may be obtained by treating the hydrochloride salt with substantially a stoichiometric amount of 10%–20% aqueous sodium hydroxide. The resulting insoluble precipitate is recovered, washed, and dried. 1,5-diphenylbiguanide melts at 148°–149° C.

EXAMPLE 3

1,5-di-p-sulfophenylbiguanide

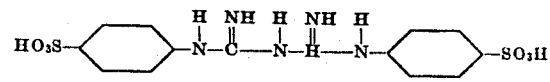

| Reagents | Molar Ratio |
| --- | --- |
| Calcium dicyanimide | 0.45 |
| Sulfanilic acid | 2.00 |
| Water | 35.00 |

The calcium dicyanimide is dissolved in the water, and the sulfanilic acid is carefully added to this agitated mixture while the temperature is raised from 60° to about 100° C. The reaction mixture remains a clear solution and it is refluxed for about an hour. The reaction mixture is cooled to about 50° C. and acidified with dilute hydrochloric acid. The free material, 1,5-di-p-sulfophenylbiguanide, is thus precipitated from the aqueous solution containing the soluble calcium salt. This colorless solid is recovered, washed, and dried.

EXAMPLE 4

1,5-dimethyl-1,5-diphenylbiguanide

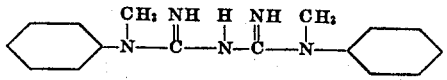

| Reagents | Molar Ratio |
| --- | --- |
| Calcium dicyanimide | 0.45 |
| Methylaniline | 2.00 |
| Hydrochloric acid, conc | 1.00 |
| Water | 33.00 |

The methylaniline, hydrochloric acid, and about 40% of the above amount of water are carefully mixed to form an aqueous solution of methylaniline hydrochloride. The calcium dicyanimide dissolved in the remaining amount of water is carefully added to the aqueous amine hydrochloride at 90°–100° C. This agitated mixture is heated for about an hour after the addition of the calcium dicyanimide solution is completed. This solution is acidified, and after standing, crystals of 1,5-dimethyl-1,5-diphenyl-biguanide hydrochloride separate. This material is filtered, washed, and dried. It decomposes at 209°–210° C., and becomes a clear liquid at 215° C. This material forms a hydrate which loses its water of crystallization slightly below 100° C. and even lower if it is dehydrated under vacuum. The free base is obtained by treating the hydrochloride with aqueous sodium hydroxide.

EXAMPLE 5

1,5-di-β-naphthylbiguanide

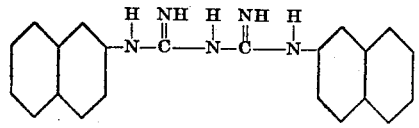

| Reagents | Molar Ratio |
| --- | --- |
| Sodium dicyanimide | 1.0 |
| β-Naphthylamine | 2.0 |
| Hydrochloric acid, 10% | 2.0 |
| Water | 13.9 |
| 2-Ethoxyethanol-1 | 13.0 |

The sodium dicyanimide and β-naphthylamine are mixed in the aqueous 2-ethoxyethanol-1, and this mixture is agitated and heated to substantially 95°–100° C. The dilute hydrochloric acid is carefully added, and a precipitate soon appears in the original clear solution. After a total of 1–2 hours heating at substantially 95°–100° C., the precipitate is removed from the hot reaction mixture. After washing and drying, the resultant 1,5-di-β-naphthylbiguanide hydrochloride decomposes at 268° C. After the original filtrate is cooled, an additional portion of the hydrochloride salt may be recovered. This salt is insoluble or only slightly soluble in the usual organic solvents and also in hot water. The free base may be prepared from the hydrochloride salt by suspending the latter in ethanol and adding a slight excess of alkali over the theoretical amount required. The free base, 1,5-di-β-naphthylbiguanide is recovered, washed, and dried. It decomposes at 175°–177° C. and is insoluble in water and only slightly soluble in hot ethanol. The acetate salt may be prepared from the above free base, and it is insoluble in hot water but soluble in hot alcohol.

The various examples that are included above are not to be considered as restrictive of the present invention. They are typical of the wide variety of substituted biguanides that may be prepared by the method of this invention.

The substituted biguanides of the present invention are valuable chemicals useful as intermediates in the preparation of chemotherapeutic agents, pharmaceuticals, textile agents, rubber chemicals, plastics, resins, and the like.

While the invention has been described with particular reference to specific embodiments, it is to be understood that it is not to be limited thereto but is to be construed broadly and restricted solely by the scope of the appended claims.

What is claimed:

1. As an improvement in the manufacture of 1,5-diarylbiguanide compounds, the improvement which comprises reacting in an aqueous media, a metal salt of dicyanimide selected from the class consisting of the alkali metal and alkaline earth metal salts thereof with an acid salt of an aryl amine selected from the class consisting of primary aryl amines and secondary aryl amines in the ratio of one equivalent of the dicyanimide reactant to two equivalents of the amine reactant, at a temperature of at least 80° C. at atmospheric pressure, and recovering the 1,5-diarylbiguanide compound so obtained.

2. The process of claim 1 wherein said acid salt is a primary aryl amine hydrochloride.

3. The process of claim 1 wherein said acid salt is a secondary aryl amine hydrochloride.

4. The process of claim 1 wherein said metal salt is calcium dicyanimide.

5. A method of preparing a 1,5-diphenylbiguanide which includes the steps of reacting in water calcium dicyanimide with aniline hydrochloride in the ratio of four mols of aniline hydrochloride to one mol of calcium dicyanimide at a temperature of substantially 80° C. and recovering 1,5-diphenylbiguanide.

6. A method of preparing a 1,5-dimethyl-1,5-diphenylbiguanide which includes the steps of reacting in water calcium dicyanimide with methylaniline hydrochloride in the ratio of four mols of methylaniline hydrochloride to one mol of calcium dicyanimide.

DANIEL E. NAGY.

REFERENCES CITED

The following references are of record in the file of this patent:

UNITED STATES PATENTS

| Number | Name | Date |
|---|---|---|
| 1,777,738 | Scott | Oct. 7, 1930 |
| 2,121,337 | Brodersen et al. | June 21, 1938 |
| 2,149,709 | Rein | Mar. 7, 1939 |
| 2,223,935 | Daniels et al. | Dec. 3, 1940 |
| 2,331,377 | D'Alelio | Oct. 12, 1943 |
| 2,350,453 | Ericks | June 6, 1944 |
| 2,357,268 | Roblin et al. | Aug. 29, 1944 |

OTHER REFERENCES

Slotta, Ber. 62A (1929) page 1394, Beilstein vol. 12, pages 370, 431, 944.